US012807012B2

(12) United States Patent
Kim

(10) Patent No.: US 12,807,012 B2
(45) Date of Patent: Nov. 24, 2026

(54) DEVICE AND METHOD FOR CHARGING ELECTRIFIED VEHICLE

(71) Applicants: Hyundai Motor Company, Seoul (KR); Kia Corporation, Seoul (KR)

(72) Inventor: Duk Joo Kim, Jeonju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 1042 days.

(21) Appl. No.: 18/052,392

(22) Filed: Nov. 3, 2022

(65) Prior Publication Data

US 2023/0311680 A1 Oct. 5, 2023

(30) Foreign Application Priority Data

Mar. 28, 2022 (KR) ........................ 10-2022-0038099

(51) Int. Cl.
*B60L 53/16* (2019.01)
*B60L 53/60* (2019.01)

(52) U.S. Cl.
CPC ............... *B60L 53/16* (2019.02); *B60L 53/60* (2019.02)

(58) Field of Classification Search
CPC ................................. B60L 53/16; B60L 53/60
USPC .......................................................... 320/109
See application file for complete search history.

(56) References Cited

U.S. PATENT DOCUMENTS

2005/0116683 A1* 6/2005 Cheng ....................... H01F 3/02 320/108
2006/0061323 A1* 3/2006 Cheng ..................... H02J 50/10 320/108
2006/0076922 A1* 4/2006 Cheng ................... H01M 10/46 320/108
2014/0266004 A1* 9/2014 Andrews, Jr. ........... B60L 58/12 320/108
2015/0214751 A1* 7/2015 Niizuma .............. B60L 53/126 307/9.1
2015/0274034 A1* 10/2015 Hourtane ................. B60M 1/08 191/6
2018/0015836 A1* 1/2018 Madon .................... B60L 53/18
(Continued)

FOREIGN PATENT DOCUMENTS

CN 116811609 A * 9/2023 ............. B60L 53/16
CN 118973854 A * 11/2024
(Continued)

*Primary Examiner* — Suresh Memula
(74) *Attorney, Agent, or Firm* — Slater Matsil, LLP

(57) ABSTRACT

An embodiment device for charging an electrified vehicle includes a first contactor block and a second contactor block each including a first contactor provided under a ground of a charging station to supply a positive direct current voltage, a second contactor provided under the ground of the charging station to supply a negative direct current voltage, a third contactor provided under the ground of the charging station to supply a ground voltage, and a fourth contactor provided under the ground of the charging station to transfer a control signal controlling a charging operation of the electrified vehicle to the electrified vehicle, and a controller configured to provide the positive direct current voltage to the first contactor, to provide the negative direct current voltage to the second contactor, to provide the ground voltage to the third contactor, and to provide the control signal to the fourth contactor.

20 Claims, 10 Drawing Sheets

(56) References Cited

U.S. PATENT DOCUMENTS

| | | | | |
|---|---|---|---|---|
| 2020/0101856 | A1* | 4/2020 | Klausner | B60L 50/50 |
| 2020/0193722 | A1* | 6/2020 | Moran | G06Q 20/401 |
| 2024/0181904 | A1* | 6/2024 | Jung | B60L 53/16 |

FOREIGN PATENT DOCUMENTS

| | | | | | |
|---|---|---|---|---|---|
| DE | 102021111481 | A1 | * | 11/2022 | H02J 7/62 |
| DE | 202022103788 | U1 | * | 7/2023 | B60L 53/16 |
| DE | 102023106637 | A1 | * | 9/2024 | B60L 53/36 |
| WO | WO-2018192960 | A1 | * | 10/2018 | B60L 55/00 |
| WO | WO-2022233881 | A1 | * | 11/2022 | H02J 7/62 |
| WO | WO-2023006900 | A1 | * | 2/2023 | H01R 13/2457 |

* cited by examiner

DEVICE AND METHOD FOR CHARGING ELECTRIFIED VEHICLE

CROSS-REFERENCE TO RELATED APPLICATIONS

This application claims the benefit of Korean Patent Application No. 10-2022-0038099, filed on Mar. 28, 2022, which application is hereby incorporated herein by reference.

TECHNICAL FIELD

The present disclosure relates to a vehicle.

BACKGROUND

An electric vehicle is being actively supplied due to environmental regulations around the world, and a charging-related device of the electric vehicle is also being actively supplied.

An environment-friendly vehicle such as the electric vehicle (EV) or a plug-in hybrid vehicle (PHEV) uses electric vehicle supply equipment (EVSE) installed at a charging station to charge a battery. To charge the battery, a charging cable of the EVSE may be connected to an inlet of the electric vehicle.

In the electric vehicle (EV) including the plug-in hybrid vehicle (PHEV), the battery that is a power source for driving the vehicle may be rapidly charged by a direct current (DC) power supply (or a quick charging equipment) or may be slowly charged by an alternating current (AC) power supply.

The above information disclosed in this background section is only for enhancement of understanding of the background of embodiments of the disclosure, and therefore it may contain information that does not form the prior art that is already known to a person of ordinary skill in the art.

SUMMARY

The present disclosure relates to a vehicle. Particular embodiments relate to a device and a method for charging an electrified vehicle.

Embodiments of the present disclosure provide a device and a method for charging an electrified vehicle which are capable of automatically charging the electrified vehicle and reducing an installation space for the device for charging the electrified vehicle.

An embodiment may provide the device for charging the electrified vehicle including a first contactor block that includes a first contactor that is installed under a ground of a charging station and supplies a positive direct current (DC) voltage for charging the electrified vehicle to the electrified vehicle, a second contactor that is installed under the ground of the charging station and supplies a negative direct current (DC) voltage for charging the electrified vehicle to the electrified vehicle, a third contactor that is installed under the ground of the charging station and supplies a ground voltage for charging the electrified vehicle to the electrified vehicle, and a fourth contactor that is installed under the ground of the charging station and transfers a control signal controlling a charging operation of the electrified vehicle to the electrified vehicle, a second contactor block that includes the first contactor, the second contactor, the third contactor, and the fourth contactor, and a controller configured to provide the positive direct current (DC) voltage to the first contactor, to provide the negative direct current (DC) voltage to the second contactor, to provide the ground voltage to the third contactor, and to provide the control signal to the fourth contactor when the electrified vehicle is positioned on the first contactor block or on the second contactor block.

The device for charging the electrified vehicle may further include a first pressure sensor that is installed under the ground of the charging station and detects that the electrified vehicle is positioned on the first contactor block to provide the detected data to the controller and a second pressure sensor that is installed under the ground of the charging station and detects that the electrified vehicle is positioned on the second contactor block to provide the detected data to the controller.

The device for charging the electrified vehicle may further include a first separation device that is installed between the first contactor block and the second contactor block adjacent to the first contactor block. In response to a switch control signal of the controller, the first separation device may connect the first contactor of the first contactor block to the first contactor of the second contactor block, may connect the second contactor of the first contactor block to the second contactor of the second contactor block, may connect the third contactor of the first contactor block to the third contactor of the second contactor block, and may connect the fourth contactor of the first contactor block to the fourth contactor of the second contactor block.

The device for charging the electrified vehicle may further include a third contactor block that includes the first contactor, the second contactor, the third contactor, and the fourth contactor, a third pressure sensor that is installed under the ground of the charging station and detects that the electrified vehicle is positioned on the third contactor block to provide the detected data to the controller, and a second separation device that is installed between the second contactor block and the third contactor block adjacent to the second contactor block. In response to the switch control signal of the controller, the second separation device may connect the first contactor of the second contactor block to the first contactor of the third contactor block, may connect the second contactor of the second contactor block to the second contactor of the third contactor block, may connect the third contactor of the second contactor block to the third contactor of the third contactor block, and may connect the fourth contactor of the second contactor block to the fourth contactor of the third contactor block.

The first contactor may include a first hole into which a first cable of the electrified vehicle that transfers the positive direct current (DC) voltage is inserted. The second contactor may include a second hole into which a second cable of the electrified vehicle that transfers the negative direct current (DC) voltage is inserted. The third contactor may include a third hole into which a third cable of the electrified vehicle that transfers the ground voltage is inserted. The fourth contactor may include a fourth hole into which a fourth cable of the electrified vehicle that transfers the control signal is inserted. An operation of inserting the first cable of the electrified vehicle into the first hole of the first contactor, an operation of inserting the second cable of the electrified vehicle into the second hole of the second contactor, an operation of inserting the third cable of the electrified vehicle into the third hole of the third contactor, and an operation of inserting the fourth cable of the electrified vehicle into the fourth hole of the fourth contactor may be controlled by a cable control device of the electrified vehicle.

An embodiment may provide the method for charging the electrified vehicle including detecting, by a controller of a device for charging the electrified vehicle, a position where the electrified vehicle is parked at a charging station including contactor blocks that are installed under a ground of the charging station and supply voltages and a control signal for charging the electrified vehicle to the electrified vehicle in response to an output signal of a pressure sensor installed under the ground of the charging station, electrically connecting, by the controller of the device for charging the electrified vehicle, the contactor blocks installed in a position corresponding to the parking position of the electrified vehicle, transmitting, by the controller of the device for charging the electrified vehicle, a chargeable signal included in the control signal to the electrified vehicle so that cables for charging the electrified vehicle are inserted into holes of the contactor blocks, and supplying, by the controller of the device for charging the electrified vehicle, the voltages and the control signal for charging the electrified vehicle to the electrified vehicle.

Each of the contactor blocks may include a first contactor that supplies a positive direct current (DC) voltage for charging the electrified vehicle to the electrified vehicle, a second contactor that supplies a negative direct current (DC) voltage for charging the electrified vehicle to the electrified vehicle, a third contactor that supplies a ground voltage for charging the electrified vehicle to the electrified vehicle, and the fourth contactor that transfers the control signal controlling a charging operation of the electrified vehicle to the electrified vehicle.

The electrically connecting the contactor blocks may include controlling, by the controller of the device for charging the electrified vehicle, a separation device installed between the contactor blocks to connect the first contactor of a first contactor block installed on one side of the separation device among the contactor blocks to the first contactor of the second contactor block installed on the other side of the separating device among the contactor blocks, controlling, by the controller of the device for charging the electrified vehicle, the separation device to connect the second contactor of the first contactor block to the second contactor of the second contactor block, controlling, by the controller of the device for charging the electrified vehicle, the separation device to connect the third contactor of the first contactor block to the third contactor of the second contactor block, and controlling, by the controller of the device for charging the electrified vehicle, the separation device to connect the fourth contactor of the first contactor block to the fourth contactor of the second contactor block.

The device and the method for charging the electrified vehicle according to the embodiments may automatically charge a battery of the electrified vehicle and may reduce the installation space for the device for charging the electrified vehicle.

BRIEF DESCRIPTION OF THE DRAWINGS

A brief description of the drawings will be provided to more sufficiently understand the drawings which are used in the detailed description of embodiments of the present disclosure.

Figure 1:
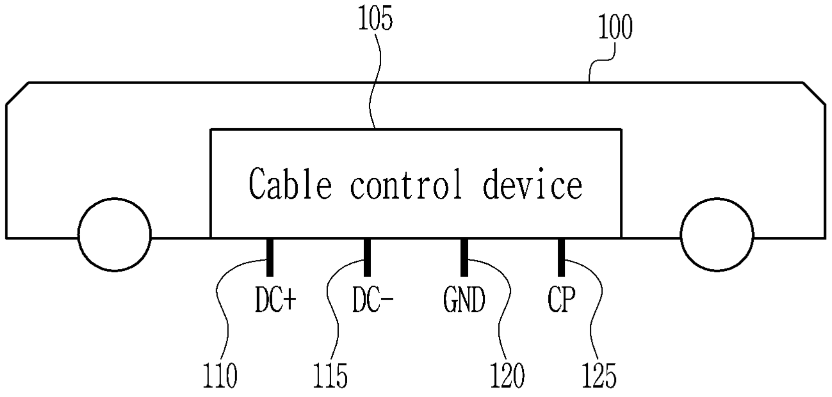
FIG. 1 is a view illustrating an electrified vehicle charged by a device for charging the electrified vehicle according to an embodiment.

The following reference identifiers may be used in connection with the accompanying drawings to describe exemplary embodiments of the present disclosure.

305: first contactor
310: second contactor
315: third contactor
320: fourth contactor
325: contactor block
330: pressure sensor
335: separation device
340: controller

DETAILED DESCRIPTION OF ILLUSTRATIVE EMBODIMENTS

In order to sufficiently understand embodiments of the present disclosure and features achievable by embodying embodiments of the present disclosure, the accompanying drawings illustrating embodiments of the present disclosure and contents described in the accompanying drawings are to be referenced.

Hereinafter, embodiments of the present disclosure will be described in detail by describing exemplary embodiments of the present disclosure with reference to the accompanying drawings. In describing embodiments of the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Most electric vehicles (e.g., electric buses) are charged by plug-in charging. To operate the electric vehicles, a transport company arranges separate manpower.

A charging system using a pantograph automatically charges an electric vehicle. However, the charging system using the pantograph occupies a lot of installation space for the pantograph.

Figure 2:
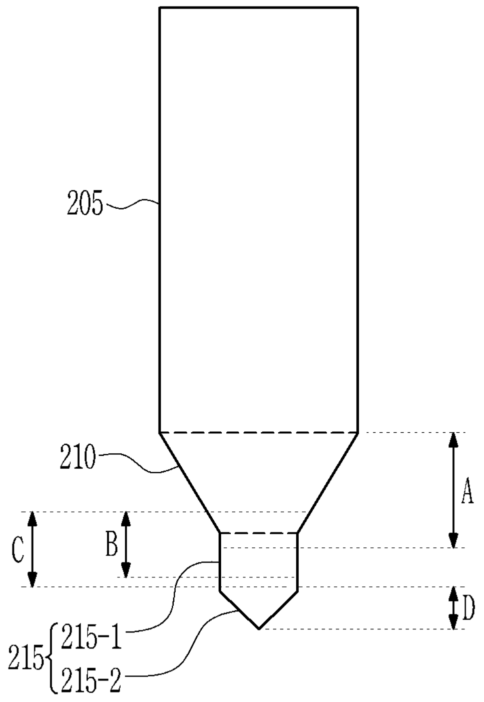
FIG. 2 is a view explaining a cable shown in FIG. 1.
Figure 3:
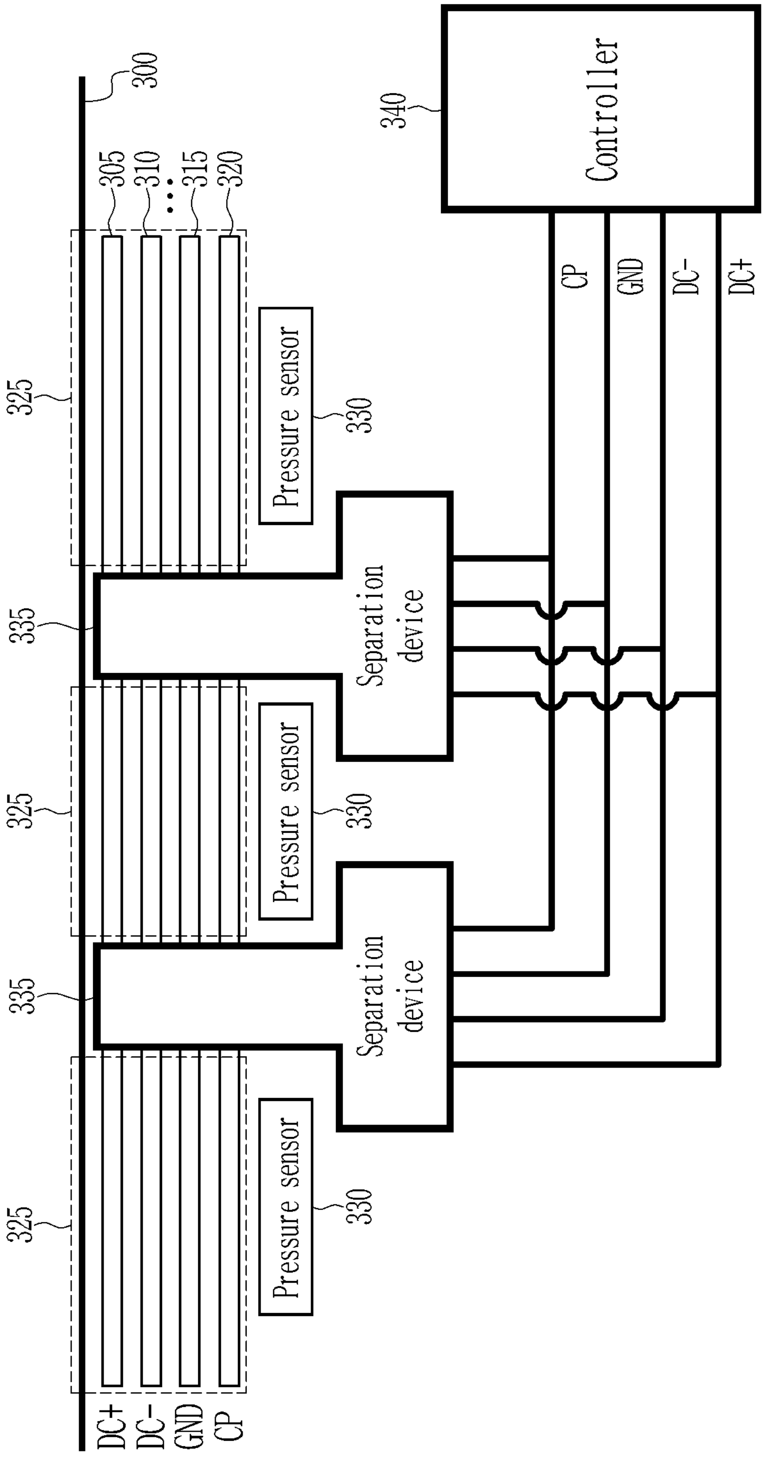
FIG. 3 is a view explaining the device for charging the electrified vehicle according to an embodiment.
Figure 4:
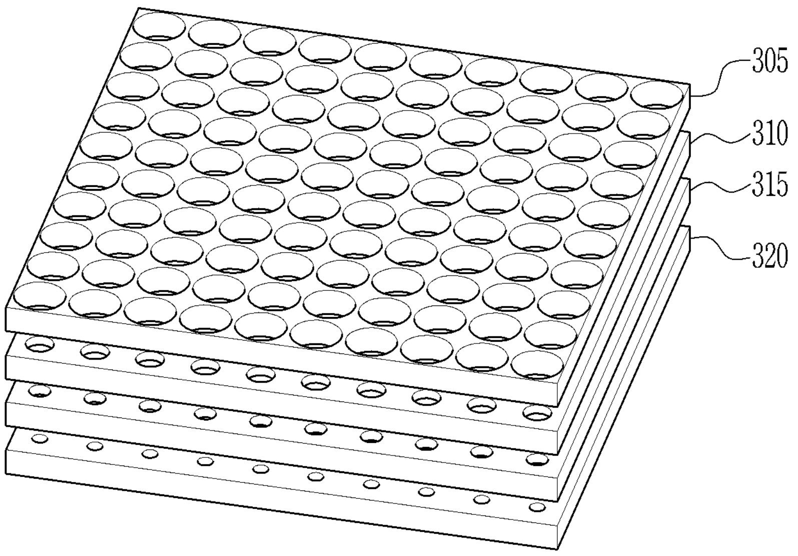
FIG. 4 is a perspective view explaining a contactor block shown in FIG. 3.
Figure 5:
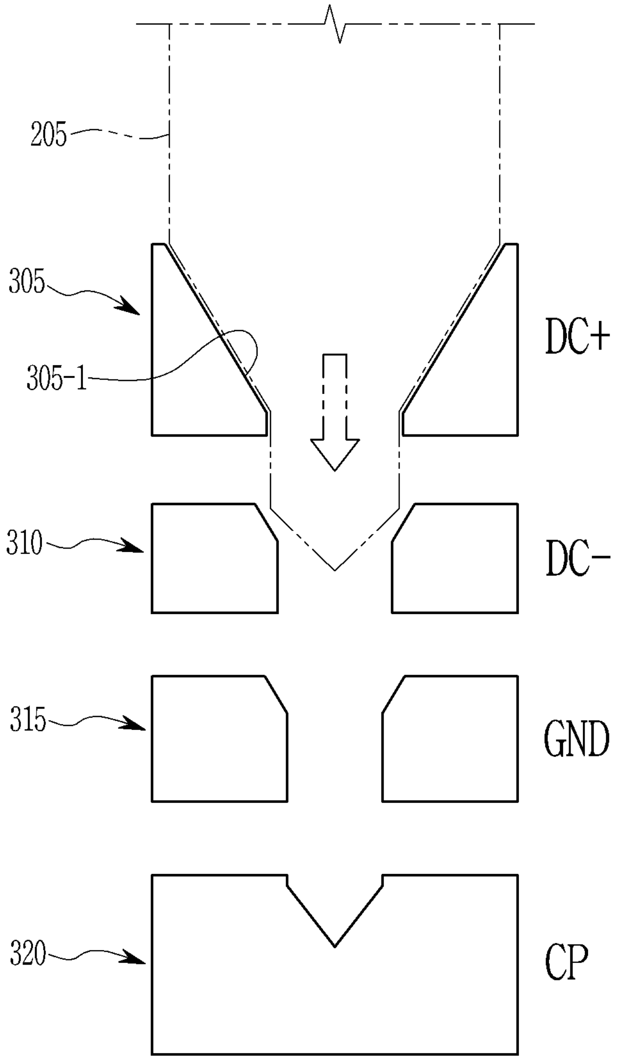
FIG. 5 is a view explaining a cross-section of a hole of a first contactor shown in FIG. 3.
Figure 6:
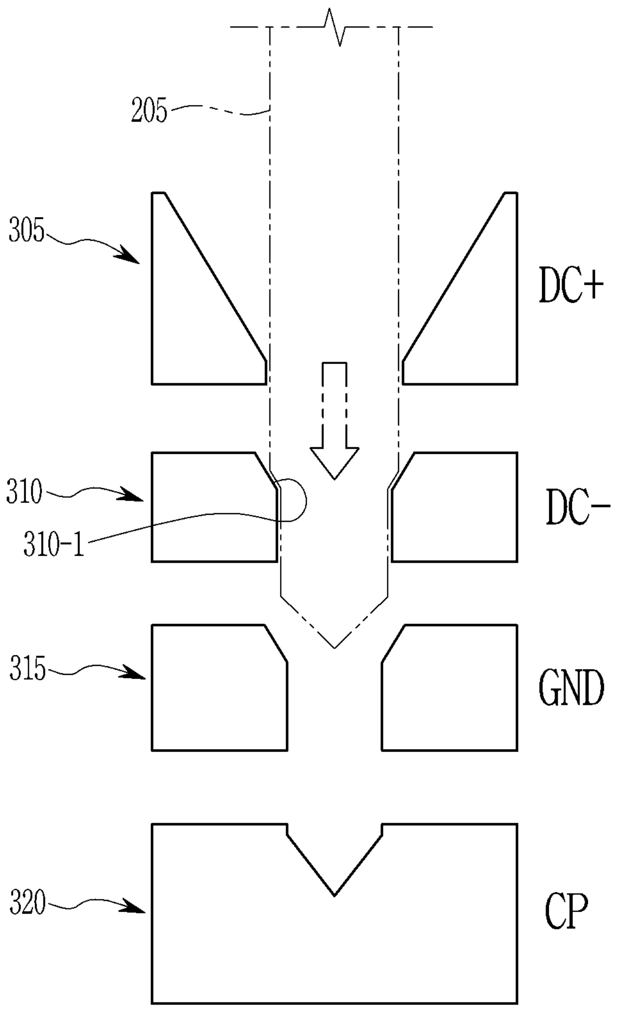
FIG. 6 is a view explaining a cross-section of a hole of a second contactor shown in FIG. 3.
Figure 7:
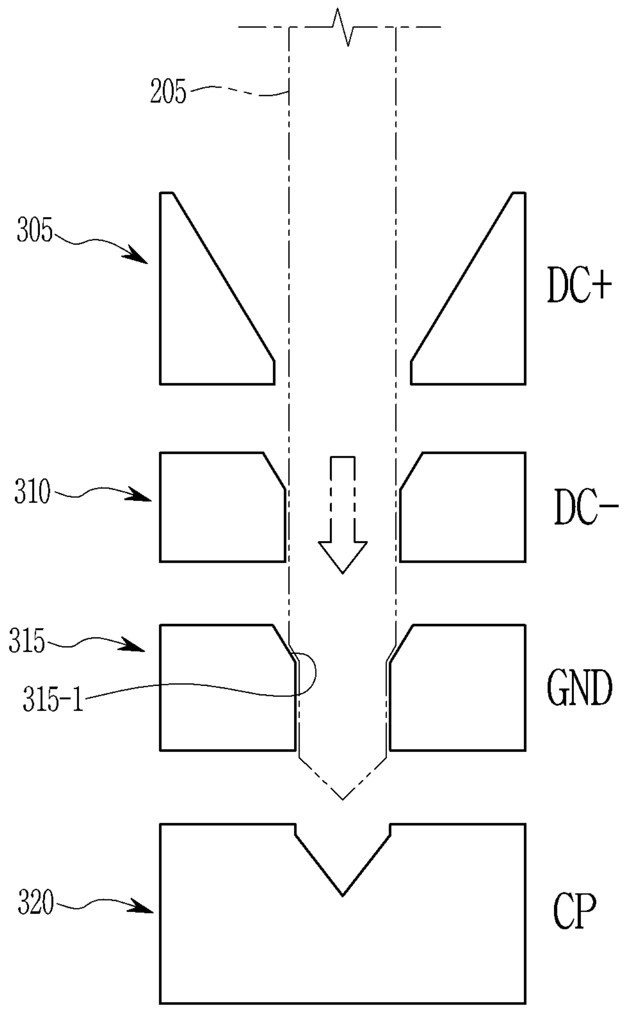
FIG. 7 is a view explaining a cross-section of a hole of a third contactor shown in FIG. 3.

FIG. 1 is a view illustrating an electrified vehicle charged by a device for charging the electrified vehicle according to an embodiment. FIG. 2 is a view explaining a cable shown in FIG. 1. FIG. 3 is a view explaining the device for charging the electrified vehicle according to an embodiment. FIG. 4 is a perspective view explaining a contactor block shown in FIG. 3. FIG. 5 is a longitudinal cross-section view explaining a cross-section of a first hole of a first contactor shown in FIG. 3. FIG. 6 is a view explaining a cross-section of a second hole of a second contactor shown in FIG. 3. FIG. 7 is a view explaining a cross-section of a third hole of a third contactor shown in FIG. 3.

Figure 8:
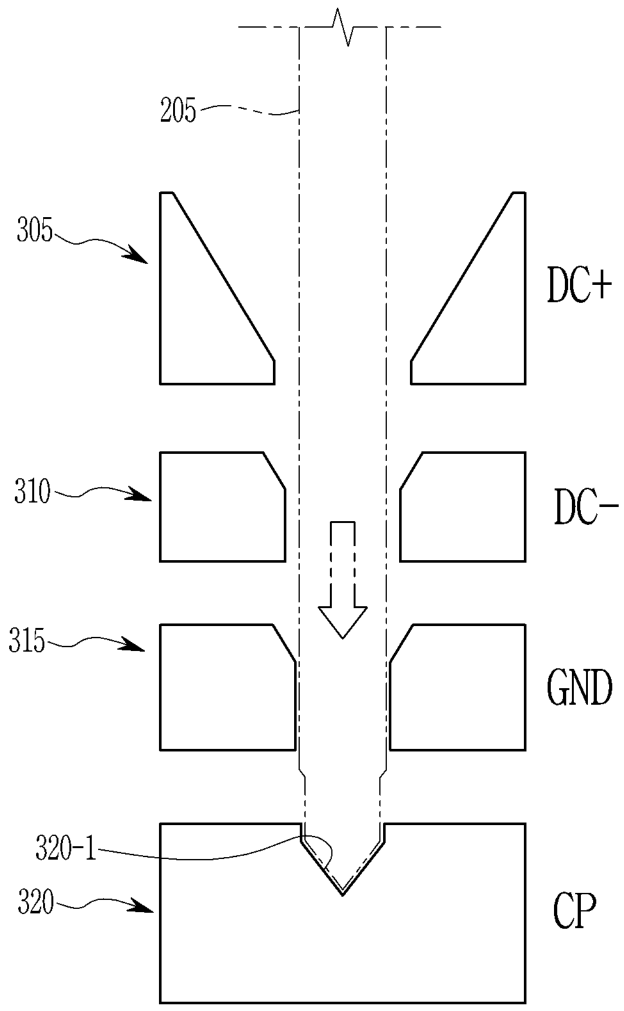
FIG. 8 is a view explaining a cross-section of a hole of a fourth contactor shown in FIG. 3.
Figure 9:
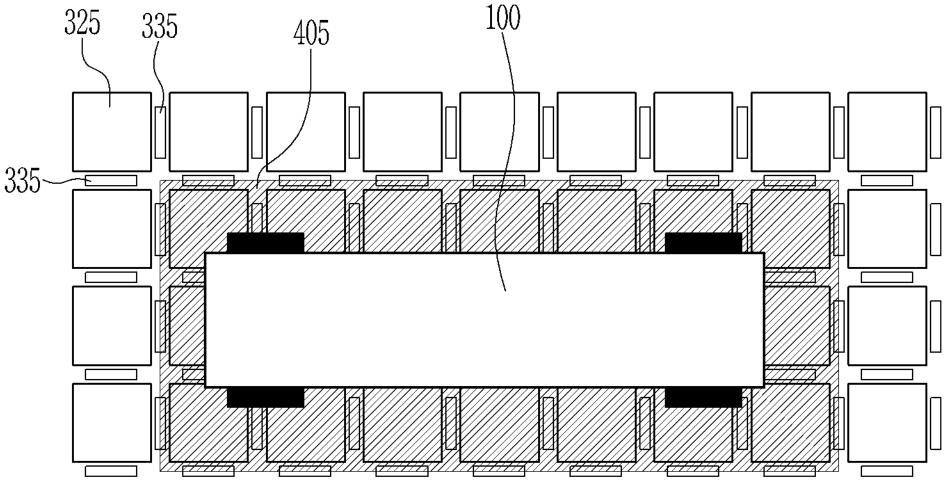
FIG. 9 is a plan view explaining a charging zone of a charging station generated by the device for charging the electrified vehicle shown in FIG. 3.

FIG. 8 is a view explaining a cross-section of a fourth hole of a fourth contactor shown in FIG. 3. FIG. 9 is a plan view explaining a charging zone of a charging station generated by the device for charging the electrified vehicle shown in FIG. 3.

Referring to FIG. 1 through FIG. 9, the electrified vehicle 100 may include a cable control device 105. For example, the electrified vehicle 100 may include a fuel cell electric vehicle (FCEV), an electric vehicle, or a hybrid electric vehicle, and may include an electric motor for generating driving torque of the vehicle and a battery supplying electric power to the electric motor. The electrified vehicle 100 may include a commercial vehicle such as an electric bus.

The cable control device 105 may control a first cable 110 that supplies a positive direct current (DC) voltage DC+ for charging the electrified vehicle 100 (or charging the battery of the electrified vehicle 100) so that the first cable is inserted into the first hole 305-1 of the first contactor 305 that is included in a contactor block 325 of FIG. 3, is installed under a ground 300 of the charging station, and supplies the positive direct current (DC) voltage DC+ to the electrified vehicle.

The cable control device 105 may control a second cable 115 that transfers a negative direct current (DC) voltage DC− for charging the electrified vehicle 100 so that the second cable is inserted into the second hole 310-1 of the second contactor 310 that is included in the contactor block 325 of FIG. 3, is installed under the ground 300 of the charging station, and supplies the negative direct current (DC) voltage DC− to the electrified vehicle.

The cable control device 105 may control a third cable 120 that transfers a ground voltage GND for charging the electrified vehicle 100 so that the third cable is inserted into the third hole 315-1 of the third contactor 315 that is included in the contactor block 325 of FIG. 3, is installed under the ground 300 of the charging station, and supplies the ground voltage GND to the electrified vehicle.

The cable control device 105 may control a fourth cable 125 that transfers a control signal CP (or a control pilot signal) that controls a charging operation of the electrified vehicle 100 so that the fourth cable is inserted into the fourth hole 320-1 of the fourth contactor 320 that is included in the contactor block 325 of FIG. 3, is installed under the ground 300 of the charging station, and supplies the control signal CP to the electrified vehicle. The control signal CP may be a signal according to power line communication performed between the electrified vehicle 100 and a controller 340 of the device for charging the electrified vehicle.

For example, the first cable 110, the second cable 115, the third cable 120, or the fourth cable 125 may be a flexible cable.

As shown in FIG. 2, the cable may include an insulation portion 205, a current carrying portion 210, and a guide portion 215. The guide portion 215 may allow the cable to be easily inserted into the hole of the contactor and may also perform a function of the current carrying portion.

Referring to FIG. 2, the current carrying portion 210 may be formed as a shape of a partial cone whose diameter decreases toward a bottom portion thereof. The guide portion 215 may include a first guide portion 215-1 formed in a cylinder shape below the current carrying portion 210 and a second guide portion 215-2 formed in a conical shape (or a hemisphere shape) whose diameter decreases toward a bottom portion of the first guide portion 215-1.

The cable control device 105 may include an actuator for performing an insert operation of the cable. The actuator may include a sensor that detects that there is no change in a length of the cable in order to detect that the cable is completely inserted into the hole of the contactor.

As shown in FIG. 3, the device for charging the electrified vehicle may include contactor blocks 325, pressure sensors 330, separation devices 335, and the controller 340.

Each of the contactor blocks 325 may include the first contactor 305 that is installed under the ground 300 of the charging station and supplies the positive direct current (DC) voltage DC+ for charging the electrified vehicle 100 to the electrified vehicle, the second contactor 310 that is installed under the ground 300 of the charging station and supplies the negative direct current (DC) voltage DC− for charging the electrified vehicle to the electrified vehicle, the third contactor 315 that is installed under the ground of the charging station and supplies the ground voltage GND for charging the electrified vehicle to the electrified vehicle, and the fourth contactor 320 that is installed under the ground of the charging station and transfers the control signal (CP) controlling the charging operation of the electrified vehicle to the electrified vehicle.

For example, as shown in FIG. 3 and FIG. 4, the second contactor 310 may be disposed under the first contactor 305, the third contactor 315 may be disposed under the second contactor 310, and the fourth contactor 320 may be disposed under the third contactor 315.

For example, as shown in FIG. 3 and FIG. 4, the first contactor 305, the second contactor 310, the third contactor 315, or the fourth contactor 320 may be a layer having a quadrangle shape.

When the electrified vehicle 100 (or a wheel of the electrified vehicle) is positioned on the first contactor block 325 or on the second contactor block 325, the controller 340 may provide the positive direct current (DC) voltage DC+ to the first contactor 305, may provide the negative direct current (DC) voltage DC− to the second contactor 310, may provide the ground voltage GND to the third contactor 315, and may supply the control signal CP to the fourth contactor 320.

The controller 340 may be an electronic control unit (ECU) and may control an entire operation of the device for charging the electrified vehicle. For example, the controller 340 may be one or more microprocessors operated by a program (i.e., a control logic) or hardware (e.g., a microcomputer) including the microprocessor. The program may include a series of commands for executing a method for charging the electrified vehicle according to an embodiment. The commands may be stored in a memory of the device for charging the electrified vehicle or the controller 340.

Each of the pressure sensors 330 may be installed under the ground 300 of the charging station and may detect that the electrified vehicle 100 (or the wheel of the electrified vehicle) is positioned on the contactor block 325 to transmit the detected data to the controller 340. The pressure sensor 330 may detect a position of the electrified vehicle 100 by detecting a pressure that the electrified vehicle 100 applies (presses) to the ground 300 of the charging station. For example, the pressure sensor 330 may be disposed (positioned) under the contactor block 325.

Each of the separation devices 335 may be installed between the first contactor block 325 and the second contactor block 325 adjacent to the first contactor block. In response to a switch control signal of the controller 340, the separation device 335 may connect (or electrically connect) the first contactor 305 of the first contactor block to the first contactor 305 of the second contactor block, may connect the second contactor 310 of the first contactor block to the second contactor 310 of the second contactor block, may connect the third contactor 315 of the first contactor block to the third contactor 315 of the second contactor block, and may connect the fourth contactor 320 of the first contactor block to the fourth contactor 320 of the second contactor block. The switch control signal of the controller 340 may be activated when it is detected by the pressure sensor 330 that the electrified vehicle 100 is positioned on a specific contactor block 325. The charging zone 405 of the charging station constituted by the contactor blocks 325 generated by the switch control signal is shown in FIG. 9.

As shown in FIG. 4 and FIG. 5, the first contactor 305 may include the first hole 305-1 into which the first cable 110 of the electrified vehicle 100 that transfers the positive direct current (DC) voltage DC+ is inserted. Accordingly, the first cable 110 may be electrically connected to the first contactor 305. Herein, the first hole 305-1 may be formed as a shape corresponding to a first area (refer to an indication portion A in FIG. 2) of the current carrying portion 210 formed as the shape of the partial cone shape.

As shown in FIG. 4 and FIG. 6, the second contactor 310 may include the second hole 310-1 into which the second cable 115 of the electrified vehicle 100 that transfers the negative direct current (DC) voltage DC− is inserted. Accordingly, the second cable 115 may be electrically connected to the second contactor 310. Herein, the second hole 310-1 may be formed in a shape corresponding to a second area (refer to an indication portion B in FIG. 2) formed at a lower portion of the current carrying portion 210 and at an upper portion of the first guide portion 215-1. A diameter of the second cable 115 may be less than that of the first cable so that the second cable passes through the first hole 305-1 of the first contactor 305 and is inserted into the second hole 310-1 of the second contactor 310. When the second cable 115 passes through the first hole 305-1 of the first contactor 305, the current carrying portion 210 of the cable and the first contactor 305 may be prevented from being electrically connected to each other by the insulation portion 205.

As shown in FIG. 4 and FIG. 7, the third contactor 315 may include the third hole 315-1 into which the third cable 120 of the electrified vehicle 100 that transfers the ground voltage GND is inserted. Therefore, the third cable 120 may be electrically connected to the third contactor 315. Herein, the third hole 315-1 may be formed as a shape corresponding to a third area (refer to an indication portion C in FIG. 2) formed at a lower portion of the current carrying portion 210 and at an upper portion of the first guide portion 215-1. A diameter of the third cable 120 may be less than that of the second cable so that the third cable passes through the first hole 305-1 and the second hole 310-1 and is inserted into the third hole 315-1. When the third cable 120 passes through the first hole 305-1 of the first contactor 305 and the second hole 310-1 of the second contactor 310, the current carrying portion 210 of the cable, the first contactor 305, and the second contactor 310 may be prevented from being electrically connected to each other by the insulation portion 205.

As shown in FIG. 4 and FIG. 8, the fourth contactor 320 may include the fourth hole 320-1 into which the fourth cable 125 of the electrified vehicle 100 transferring the control signal CP is inserted. Accordingly, the fourth cable 125 may be electrically connected to the fourth contactor 320. Herein, the fourth hole 320-1 may be formed in a shape corresponding to a fourth area (refer to an indication portion D in FIG. 2) corresponding to the second guide portion 215-2. A diameter of the fourth cable 125 may be less than a diameter of the third cable so that the fourth cable passes through the first hole 305-1, the second hole 310-1, and the third hole 315-1 and is inserted into the fourth hole 320-1. When the fourth cable 125 passes through the first hole 305-1 of the first contactor 305, the second hole 310-1 of the second contactor 310, and the third hole 315-1 of the third contactor 315, the current carrying portion 210 of the cable, the first contactor 305, the second contactor 310, and the third contactor 315 may be prevented from being electrically connected to each other by the insulation portion 205.

An operation of inserting the first cable 110 of the electrified vehicle 100 into the first hole 305-1 of the first contactor 305, an operation of inserting the second cable 115 of the electrified vehicle into the second hole 310-1 of the second contactor 310, an operation of inserting the third cable 120 of the electrified vehicle into the third hole 315-1 of the third contactor 315, and an operation of inserting the fourth cable 125 of the electrified vehicle into the fourth hole 320-1 of the fourth contactor 320 may be controlled by the cable control device 105 of the electrified vehicle.

Figure 10:
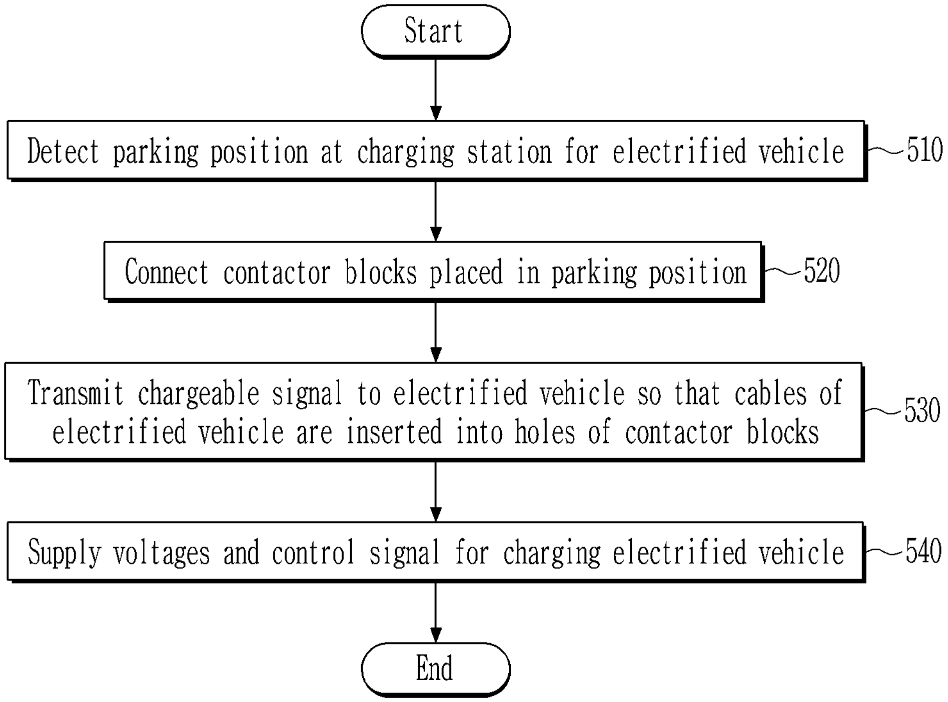
FIG. 10 is a flowchart explaining a method for charging the electrified vehicle applied to the device for charging the electrified vehicle shown in FIG. 3.

FIG. 10 is a flowchart explaining a method for charging the electrified vehicle applied to the device for charging the electrified vehicle shown in FIG. 3.

Referring to FIG. 1 through FIG. 10, in a detection step 510, the controller 340 of the device for charging the electrified vehicle may detect a parking position of the electrified vehicle 100 at the charging station including contactor blocks 325 that are installed under the ground of the charging station and supply voltages DC+, DC−, and GND and the control signal CP for charging the electrified vehicle to the electrified vehicle in response to an output signal of the pressure sensor 330 installed under the ground 300 of the charging station.

According to a step 520, the controller 340 of the device for charging the electrified vehicle 100 may electrically connect the contactor blocks 325 installed in a position corresponding to the parking position of the electrified vehicle. For example, the charging zone of the charging station in which the contactor blocks 325 are electrically connected may be shown by a reference numeral 405 in FIG. 9.

Each of the contactor blocks 325 may include the first contactor 305 that supplies the positive direct current (DC) voltage DC+ for charging the electrified vehicle 100 to the electrified vehicle, the second contactor 310 that supplies the negative direct current (DC) voltage DC− for charging the electrified vehicle to the electrified vehicle, the third contactor 315 that supplies the ground voltage GND for charging the electrified vehicle to the electrified vehicle, and the fourth contactor 320 that transfers the control signal (CP) controlling the charging operation of the electrified vehicle to the electrified vehicle.

The controller 340 of the device for charging the electrified vehicle may control the separation device 335 installed between the contactor blocks 325 to connect (or electrically connect) the first contactor 305 of the first contactor block installed on one side (e.g., a front side) of the separation device among the contactor blocks to the first contactor 305 of the second contactor block installed on the other side (e.g., a rear side) of the separation device among the contactor blocks, to connect the second contactor 310 of the first contactor block to the second contactor 310 of the second contactor block, to connect the third contactor 315 of the first contactor block to the third contactor 315 of the second contactor block, and to connect the fourth contactor 320 of the first contactor block to the fourth contactor 320 of the second contactor block.

According to a step 530, the controller 340 of the device for charging the electrified vehicle may transmit a chargeable signal included in the control signal CP to the electrified vehicle 100 so that the cables 110, 115, 120, and 125 for charging the electrified vehicle 100 are inserted into the holes of the contactor blocks 325.

According to a step 540, the controller 340 of the device for charging the electrified vehicle may supply the voltages DC+, DC−, and GND and the control signal CP for charging the electrified vehicle 100 to the electrified vehicle.

The components, "~units", "~or", blocks, or modules used in an embodiment may be implemented by software such as tasks, classes, sub-routines, processes, objects, execution threads, or programs performed in a predetermined region on a memory or hardware such as a field-programmable gate array (FPGA) or an application-specific integrated circuit (ASIC) and may be implemented by a combination of the software and the hardware. The components, '~ part', or the like may be embedded in a computer-readable storage medium, and some part thereof may be dispersedly distributed in a plurality of computers.

As set forth above, embodiments have been disclosed in the accompanying drawings and the specification. Herein, specific terms have been used, but are just used for the purpose of describing embodiments of the present disclosure and are not used for qualifying the meaning or limiting the scope of the present disclosure, which is disclosed in the appended claims. Therefore, it will be understood by those skilled in the art that various modifications and equivalent embodiments are possible from the present disclosure. Accordingly, the actual technical protection scope of the present disclosure must be determined by the spirit of the appended claims.

What is claimed is:

1. A device for charging an electrified vehicle, the device comprising:

- a first contactor block and a second contactor block each comprising:
  - a first contactor provided under a ground of a charging station and configured to supply a positive direct current voltage for charging the electrified vehicle to the electrified vehicle,
  - a second contactor provided under the ground of the charging station and configured to supply a negative direct current voltage for charging the electrified vehicle to the electrified vehicle,
  - a third contactor provided under the ground of the charging station and configured to supply a ground voltage for charging the electrified vehicle to the electrified vehicle, and
  - a fourth contactor provided under the ground of the charging station and configured to transfer a control signal controlling a charging operation of the electrified vehicle to the electrified vehicle;
- a controller configured to provide the positive direct current voltage to the first contactor, to provide the negative direct current voltage to the second contactor, to provide the ground voltage to the third contactor, and to provide the control signal to the fourth contactor based on the electrified vehicle being positioned on the first contactor block or on the second contactor block;
- a first pressure sensor provided under the ground of the charging station and configured to detect that the electrified vehicle is positioned on the first contactor block, and to provide data indicative of whether the electrified vehicle is positioned on the first contactor block to the controller;
- a second pressure sensor provided under the ground of the charging station and configured to detect that the electrified vehicle is positioned on the second contactor block, and to provide data indicative of whether the electrified vehicle is positioned on the second contactor block to the controller; and
- a first separation device provided between the first contactor block and the second contactor block.

2. The device of claim 1, wherein based on a switch control signal of the controller, the first separation device is configured to connect the first contactor of the first contactor block to the first contactor of the second contactor block, to connect the second contactor of the first contactor block to the second contactor of the second contactor block, to connect the third contactor of the first contactor block to the third contactor of the second contactor block, and to connect the fourth contactor of the first contactor block to the fourth contactor of the second contactor block.

3. The device of claim 2, further comprising:

- a third contactor block comprising the first contactor, the second contactor, the third contactor, and the fourth contactor;
- a third pressure sensor provided under the ground of the charging station and configured to detect that the electrified vehicle is positioned on the third contactor block, and to provide data indicative of whether the electrified vehicle is positioned on the third contactor block to the controller; and
- a second separation device provided between the second contactor block and the third contactor block adjacent to the second contactor block.

4. The device of claim 3, wherein based on the switch control signal of the controller, the second separation device is configured to connect the first contactor of the second contactor block to the first contactor of the third contactor block, to connect the second contactor of the second contactor block to the second contactor of the third contactor block, to connect the third contactor of the second contactor block to the third contactor of the third contactor block, and to connect the fourth contactor of the second contactor block to the fourth contactor of the third contactor block.

5. The device of claim 1, wherein:

- the first contactor comprises a first hole configured to receive a first cable of the electrified vehicle, the first cable being configured to transfer the positive direct current voltage;

the second contactor comprises a second hole configured to receive a second cable of the electrified vehicle, the second cable being configured to transfer the negative direct current voltage;

the third contactor comprises a third hole configured to receive a third cable of the electrified vehicle, the third cable being configured to transfer the ground voltage; and the fourth contactor comprises a fourth hole configured to receive a fourth cable of the electrified vehicle, the fourth cable being configured to transfer the control signal.

6. The device of claim 5, further comprising a cable control device configured to mount in the electrified vehicle and configured to control an operation of inserting the first cable of the electrified vehicle into the first hole of the first contactor, an operation of inserting the second cable of the electrified vehicle into the second hole of the second contactor, an operation of inserting the third cable of the electrified vehicle into the third hole of the third contactor, and an operation of inserting the fourth cable of the electrified vehicle into the fourth hole of the fourth contactor.

7. The device of claim 5, wherein the first hole has a first smallest diameter of the first hole, wherein the second hole has a second smallest diameter of the second hole, and wherein the first smallest diameter is greater than the second smallest diameter;

wherein the third hole has a third smallest diameter of the third hole, and wherein the second smallest diameter is greater than the third smallest diameter; and wherein the fourth hole has a fourth smallest diameter of the fourth hole, and wherein the third smallest diameter is greater than the fourth smallest diameter.

8. The device of claim 1, wherein the first contactor comprises a plurality of first holes, wherein each of the plurality of first holes is configured to receive a first cable of the electrified vehicle, the first cable being configured to transfer the positive direct current voltage;

wherein the second contactor comprises a plurality of second holes, wherein each of the plurality of second holes is configured to receive a second cable of the electrified vehicle, the second cable being configured to transfer the negative direct current voltage;

wherein the third contactor comprises a plurality of third holes, wherein each of the plurality of third holes is configured to receive a third cable of the electrified vehicle, the third cable being configured to transfer the ground voltage; and wherein the fourth contactor comprises a plurality of fourth holes, wherein each of the plurality of fourth holes is configured to receive a fourth cable of the electrified vehicle, the fourth cable being configured to transfer the control signal.

9. The device of claim 8, wherein each of the plurality of first holes has a first smallest diameter, wherein each of the plurality of second holes has a second smallest diameter, and wherein the first smallest diameter is greater than the second smallest diameter;

wherein each of the plurality of third holes has a third smallest diameter, and wherein the second smallest diameter is greater than the third smallest diameter; and wherein each of the plurality of fourth holes has a fourth smallest diameter, and wherein the third smallest diameter is greater than the fourth smallest diameter.

10. The device of claim 9, wherein the plurality of first holes are laid out in a first grid array pattern in the first contactor, wherein the plurality of second holes are laid out in a second grid array pattern in the second contactor, wherein the plurality of third holes are laid out in a third grid array pattern in the third contactor, and wherein the plurality of fourth holes are laid out in a fourth grid array pattern in the fourth contactor.

11. The device of claim 10, wherein the first grid array pattern of the plurality of first holes in the first contactor, the second grid array pattern of the plurality of second holes in the second contactor, the third grid array pattern of the plurality of third holes in the third contactor, and the fourth grid array pattern of the plurality of fourth holes in the fourth contactor, are vertically aligned with each other.

12. A method for charging an electrified vehicle, the method comprising:

detecting, by a controller of a device for charging the electrified vehicle, a parking position where the electrified vehicle is parked at a charging station based on an output signal of a pressure sensor installed under the ground of the charging station, the device comprising contactor blocks installed under a ground of the charging station and supplying voltages;

electrically connecting, by the controller of the device for charging the electrified vehicle, the contactor blocks installed in a position corresponding to the parking position of the electrified vehicle;

transmitting, by the controller of the device for charging the electrified vehicle, a chargeable signal included in a control signal to the electrified vehicle so that cables for charging the electrified vehicle are inserted into holes of the contactor blocks; and supplying, by the controller of the device for charging the electrified vehicle, the voltages and the control signal for charging the electrified vehicle to the electrified vehicle.

13. The method of claim 12, wherein each of the contactor blocks includes a first contactor that supplies a positive direct current voltage for charging the electrified vehicle to the electrified vehicle, a second contactor that supplies a negative direct current voltage for charging the electrified vehicle to the electrified vehicle, a third contactor that supplies a ground voltage for charging the electrified vehicle to the electrified vehicle, and a fourth contactor that transfers the control signal controlling a charging operation of the electrified vehicle to the electrified vehicle.

14. The method of claim 13, wherein electrically connecting the contactor blocks comprises:

controlling, by the controller of the device for charging the electrified vehicle, a separation device installed between the contactor blocks to connect the first contactor of a first contactor block installed on a first side of the separation device among the contactor blocks to the first contactor of a second contactor block installed on a second side of the separating separation device among the contactor blocks;

controlling, by the controller of the device for charging the electrified vehicle, the separation device to connect the second contactor of the first contactor block to the second contactor of the second contactor block;

controlling, by the controller of the device for charging the electrified vehicle, the separation device to connect the third contactor of the first contactor block to the third contactor of the second contactor block; and controlling, by the controller of the device for charging the electrified vehicle, the separation device to connect the fourth contactor of the first contactor block to the fourth contactor of the second contactor block.

15. A system for charging an electrified vehicle, the system comprising:

a charging station;

a plurality of contactor blocks, each of the plurality of contactor blocks comprising:

a first contactor provided under a ground of the charging station and configured to supply a positive direct current voltage for charging the electrified vehicle to the electrified vehicle, a second contactor provided under the ground of the charging station and configured to supply a negative direct current voltage for charging the electrified vehicle to the electrified vehicle, a third contactor provided under the ground of the charging station and configured to supply a ground voltage for charging the electrified vehicle to the electrified vehicle, and a fourth contactor provided under the ground of the charging station and configured to transfer a control signal controlling a charging operation of the electrified vehicle to the electrified vehicle;

a controller configured to provide the positive direct current voltage to the first contactor, to provide the negative direct current voltage to the second contactor, to provide the ground voltage to the third contactor, and to provide the control signal to the fourth contactor based on the electrified vehicle is positioned on one of the plurality of contactor blocks;

a plurality of pressure sensors provided under the ground of the charging station and configured to detect that the electrified vehicle is positioned on the one of the plurality of contactor blocks, and to provide data indicative of whether the electrified vehicle is positioned on one of the plurality of contactor blocks to the controller; and a first separation device provided between a first contactor block of the plurality of contactor blocks and a second contactor block of the plurality of contactor blocks adjacent to the first contactor block.

16. The system of claim 15, wherein based on a switch control signal of the controller, the first separation device is configured to connect the first contactor of the first contactor block to the first contactor of the second contactor block, to connect the second contactor of the first contactor block to the second contactor of the second contactor block, to connect the third contactor of the first contactor block to the third contactor of the second contactor block, and to connect the fourth contactor of the first contactor block to the fourth contactor of the second contactor block.

17. The system of claim 16, further comprising a second separation device provided between the second contactor block of the plurality of contactor blocks and a third contactor block of the plurality of contactor blocks adjacent to the second contactor block.

18. The system of claim 17, wherein based on the switch control signal of the controller, the second separation device is configured to connect the first contactor of the second contactor block to the first contactor of the third contactor block, to connect the second contactor of the second contactor block to the second contactor of the third contactor block, to connect the third contactor of the second contactor block to the third contactor of the third contactor block, and to connect the fourth contactor of the second contactor block to the fourth contactor of the third contactor block.

19. The system of claim 15, wherein:

the first contactor comprises a first hole configured to receive a first cable of the electrified vehicle, the first cable being configured to transfer the positive direct current voltage;

the second contactor comprises a second hole configured to receive a second cable of the electrified vehicle, the second cable being configured to transfer the negative direct current voltage;

the third contactor comprises a third hole configured to receive a third cable of the electrified vehicle, the third cable being configured to transfer the ground voltage; and the fourth contactor comprises a fourth hole configured to receive a fourth cable of the electrified vehicle, the fourth cable being configured to transfer the control signal.

20. The system of claim 19, further comprising a cable control device configured to mount in the electrified vehicle and configured to control an operation of inserting the first cable of the electrified vehicle into the first hole of the first contactor, an operation of inserting the second cable of the electrified vehicle into the second hole of the second contactor, an operation of inserting the third cable of the electrified vehicle into the third hole of the third contactor, and an operation of inserting the fourth cable of the electrified vehicle into the fourth hole of the fourth contactor.

* * * * *